Feb. 9, 1965 T. H. HOLMES ETAL 3,168,809
THRUST CONTROL
Filed April 27, 1961 2 Sheets-Sheet 1

INVENTORS
CHARLES A. GLENN
TRENT H. HOLMES
BY David S. Fishman
AGENT

INVENTORS
CHARLES A. GLENN
TRENT H. HOLMES
BY David S. Fischman
AGENT

United States Patent Office 3,168,809
Patented Feb. 9, 1965

3,168,809
THRUST CONTROL
Trent H. Holmes, Rocky Hill, and Charles A. Glenn, West Hartford, Conn., assignors to United Aircraft Corporation, East Hartford, Conn., a corporation of Delaware
Filed Apr. 27, 1961, Ser. No. 106,095
1 Claim. (Cl. 60—35.6)

This invention relates to a control mechanism. More particularly it relates to a control for actuating a valve.

This control is designed for use in conjunction with the turbine throttle valve disclosed in copending application Serial No. 106,096, filed April 27, 1961, now Patent No. 3,071,345, which is assigned to the assignee of the present application.

One feature of this invention is a control for a valve wherein a reference is established for a condition which is a function of valve position and the actual condition is compared with the reference to regulate the valve and hence the condition.

Another feature of this invention is a control wherein a program signal establishes a reference against which a condition to be regulated is compared, the reference also being used as a feedback to the program signal.

Still another feature of this invention is a control for an engine in which a propellant is supplied to an engine chamber by a turbine-driven pump, the control sensing chamber condition and regulating a throttle valve downstream of the turbine to control the chamber condition by varying the flow through the turbine.

Other features and advantages will be apparent from the specification and claim, and from the accompanying drawings which illustrate an embodiment of the invention.

Figure 1:
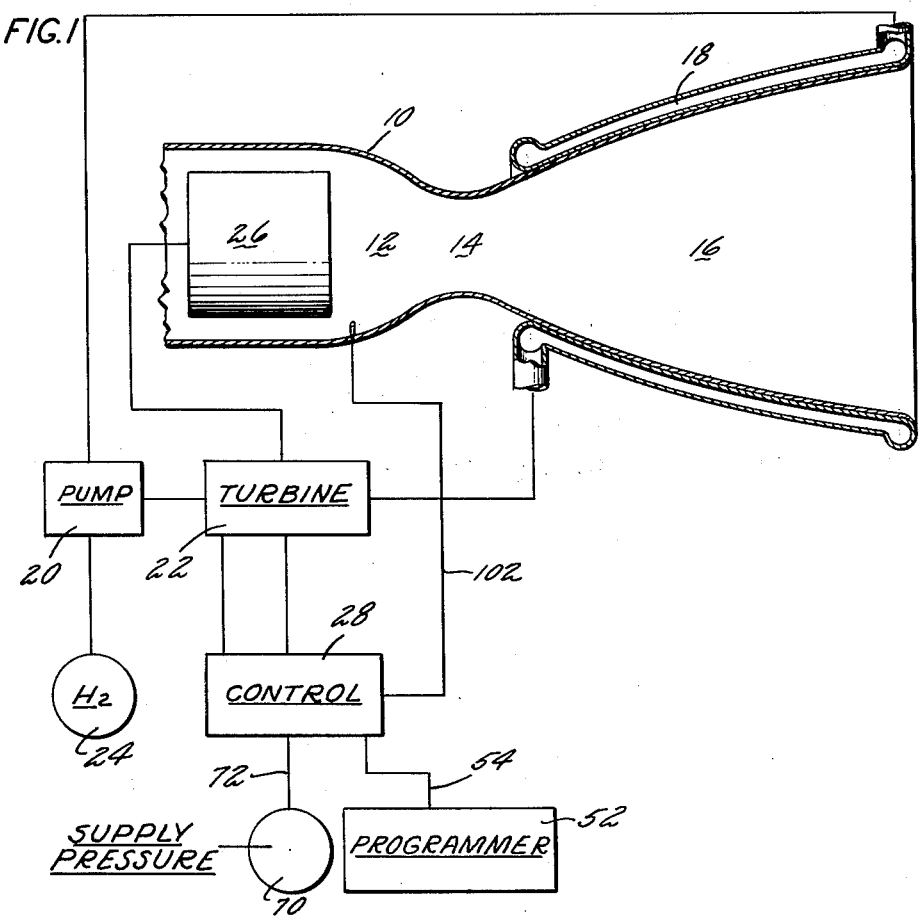
FIG. 1 is a schematic representation of an engine system incorporating the present invention.

Referring to FIG. 1, rocket 10 has a convergent chamber 12, a throat portion 14 and a divergent chamber 16. A cooling jacket 18 is attached to and surrounds at least a portion of rocket 10. A pump 20 driven by a turbine 22 supplies a propellant such as hydrogen from a tank 24 to the rocket. The hydrogen flows from pump 20 through jacket 18 where it is heated and vaporized and its energy level substantially raised so that the vaporized hydrogen can be used to drive turbine 22. The vaporized hydrogen then flows through turbine 22 and into a heating device 26 which may, for example, be a nuclear reactor. The heated hydrogen then passes through convergent chamber 12, throat 14 and divergent chamber 16 to provide propulsive thrust for the rocket.

Rocket thrust is controlled by programming the pressure in chamber 12, and to that end control 28 regulates a throttle valve in the discharge passage of turbine 22 to control the turbine output and hence the amount of hydrogen delivered by pump 20 to rocket engine 10.

Figure 2:
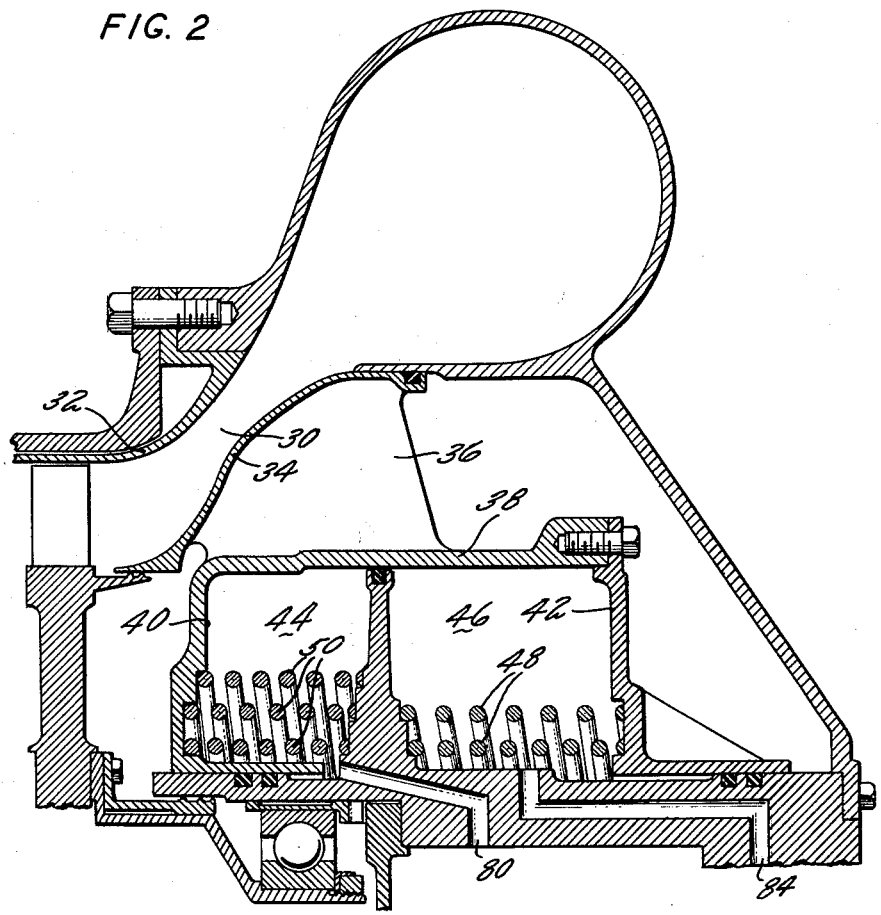
FIG. 2 is a sectional view of the turbine throttle valve which is regulated by the present invention.

FIG. 2 shows the details of the throttle valve in the discharge passage of turbine 22. This throttle valve is subject matter of the above-identified copending application and reference is made thereto for the detailed structure of the valve. For the purposes of the present invention, it is sufficient to state that the discharge passage 30 of turbine 22 is formed by a stationary outer annular wall 32 and a moveable inner annular wall 34 which constitutes a throttle valve. The wall 34 is connected by struts 36 to a double acting piston 38, the faces 40 and 42 of which are pressurized by the introduction of pressurized fluid to chambers 44 and 46 respectively. Springs 48 urge piston 38 to the right and springs 50 urge piston 38 to the left. The force of springs 48 and 50 oppose each other, and when no actuating fluid is present in either chamber 44 or 46 or the pressure in the chambers is equal, piston 38 and hence valve 34 will be moved to the left to assume a position wherein the forces of springs 48 and 50 are equalized. Thus it can be seen that an area can be established for passage 30 corresponding to the nonactuated position of piston 38.

Figure 3:
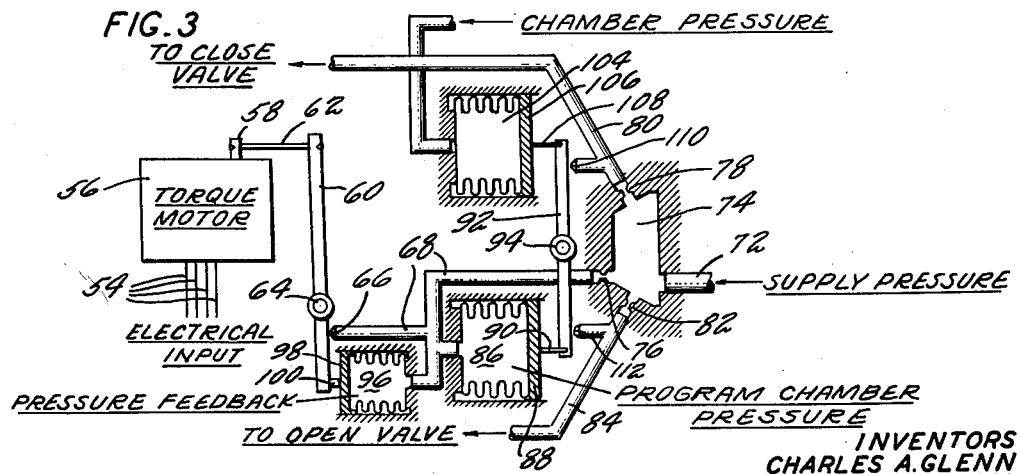
FIG. 3 is a schematic representation of the control for the turbine of FIGS. 1 and 2.

Referring now to FIG. 3 the details of the control 28 for the admission of actuating fluid to chambers 44 and 46 are disclosed. Programmer 52 generates an electrical signal which at any time indicates the desired level of pressure in chamber 12. That signal is transmitted by lines 54 to torque motor 56 to move arm 58 and position flapper 60 through link 62. Flapper 60 is pivoted at 64 and movement of flapper 60 varies the size of orifice 66 in conduit 68. A pressurized fluid is supplied from tank 70 through line 72 to chamber 74 and thence through restriction 76 to conduit 68. The pressurized fluid from chamber 74 also flows through both restriction 78 to conduit 80 and thence to chamber 44, and through restriction 82 and conduit 84 to chamber 46.

Bellows 86 communicates with conduit 68 and plate 88 on bellows 86 is attached by link 90 to flapper 92 which is pivoted at 94. Bellows 96 also communicates with conduit 68 and through plate 98 and finger 100 which is in contact with flapper 60 operates as a pressure feedback to flapper 60.

The pressure in chamber 12 is transmitted by line 102 to bellows 104 and plate 106 on bellows 104 is connected by link 108 to flapper 92. Flapper 92 cooperates with orifices 110 and 112 to regulate the pressure in conduits 80 and 84 respectively, and hence the actuating pressure in chambers 44 and 46.

In the operation of the control, a signal is generated by programmer 52 which is indicative of the desired level of pressure in chamber 12. This signal is transmitted to torque motor 56 to move arm 58 and through line 62 to position flapper 60 in accordance with the signal. Movement of flapper 60 varies the area of orifice 66 and establishes a pressure in conduit 68 which is a reference pressure for the desired pressure level in chamber 12. This reference pressure is sensed by bellows 86 and a force proportional to the reference pressure is imposed on flapper 92 through link 90. At the same time the actual pressure level in chamber 12 is transmitted by line 102 to bellows 104, and a force proportional to the actual pressure level in chamber 12 is transmitted through plate 106 and link 108 to flapper 92.

Flapper 92 acts as a comparator between the actual pressure level in chamber 12 as sensed by bellows 104 and the desired pressure level in chamber 12 as determined by the reference pressure sensed by bellows 86. If the pressure in chamber 12 should rise above the desired level, flapper 92 will be rotated in a clockwise direction to reduce the area of orifice 110 and increase the area of orifice 112 to increase the pressure of the actuating fluid flowing through conduit 80 to chamber 44 and decrease the pressure of the actuating fluid flowing through conduit 84 to chamber 46. The pressure differences in chambers 44 and 46 will move piston 38 and hence valve 34 to the left to reduce the area of passage 30. Reducing the area of passage 30 will reduce the flow through turbine 22 thereby reducing the output of turbine 22 and hence decreasing the pressure in chamber 12 by reducing the amount of hydrogen delivered from pump 20 to rocket 10. Conversely, if the pressure in chamber 12 falls below the desired level, flapper 92 will be rotated in a counterclockwise direction and move piston 38 and throttle valve 34 to the right to increase the output of turbine 22 and hence increase the pressure in chamber 12 by increasing the amount of hydrogen delivered to rocket 10 by pump 20.

Programmer 52 determines the pressure level in chamber 12 and hence rocket thrust in a predetermined manner from start to the steady state operating design condition. Programmer 52 also regulates the pressure in chamber 12 in the event that it is desired to operate the engine at other than the design condition. Programmer 52 delivers electrical signals to lines 54 to actuate torque motor 56 and position flapper 60. The position of flapper 60 determines the area of orifice 66 and hence establishes a reference pressure in conduit 68 which pressure is sensed by bellows 86 and compared with the pressure in bellows 104 in the manner described above. In addition, bellows 96 also senses the pressure in conduit 68 and operates through plate 98 and finger 100 as a pressure feedback to reflect the pressure level in conduit 68 to flapper 60.

It will be observed that prior to engine start springs 48 and 50 will move piston 38 and throttle valve 34 to a point at which the spring loads are equal. After engine start and as turbine discharge gas flows through passage 30 pressure loading on the face of valve 34 will urge the valve in an opening direction. If the supply of actuating fluid in chamber 44 and 46 were to fail, springs 48 and 50 would move the valve to a position where the net force of the springs equal the pressure loading on the face of valve 34. Hence a design can be achieved that will provide for acceptable valve opening in the event of control failure. In order to insure an acceptable valve position in the event of control failure, a plurality of springs 50 and 48 are provided so that a failure of any one spring will not result in disturbing the control failure position of valve 34 beyond a predetermined tolerance.

It is to be understood that the invention is not limited to the specific embodiment herein illustrated and described, but may be used in other ways without departure from its spirit as defined by the following claim.

We claim:

In a rocket engine having a nozzle, a combustion chamber, pumping means for delivering a propellant to said chamber, a turbine for driving said pumping means, valve means for varying the flow through said turbine, control means for controlling said valve means including an actuator connected to said valve means and being movable in opposite directions and having actuating chambers on opposite sides thereof which are selectively pressurizable to cause said actuator to move in opposite directions, first conduit means for supplying fluid to a first of said actuating chambers, second conduit means for supplying fluid to a second of said actuating chambers, means for supplying pressurized fluid to said first and second conduit means, said first and second conduit means each having a fixed and a variable area restriction therein positioned so that the pressure of said fluid therein is determined by the area of said variable area orifices, third conduit means communicating with said fluid supply means and including a fixed and varaible area orifice, first bellows means responsive to the pressure in said combustion chamber, reference combustion chamber pressure signal means, a first pivot beam responsive to said signal means to vary the area of said third conduit variable area orifice to establish a reference combustion chamber pressure in said third conduit, second bellows means responsive to said reference combustion chamber pressure in said third conduit means, and comparator means including a centrally pivoted beam whose opposite ends are positioned to form a part of said variable area orifices in said first and second conduit means, respectively, and whose opposite ends also attach to said first and second bellows, respectively, so that said pivot beam is pivoted in response to the difference between said reference combustion chamber pressure and said combustion chamber pressure to vary the areas of said first and second conduit means variable area orifices to regulate the pressure of the fluid in said first and second conduit means and hence the pressure of the fluid in said actuating chambers to regulate the position of said actuator and valve means, and a feedback bellows responsive to said reference combustion chamber pressure in said third conduit and positioned to reposition said first pivot beam.

References Cited by the Examiner

UNITED STATES PATENTS

| | | | |
|---|---|---|---|
| 1,857,386 | 5/32 | Lanquetin | 91—51 |
| 2,966,141 | 12/60 | Corbett | 91—51 |
| 2,984,968 | 5/61 | Hunter | 60—35.6 |
| 3,082,600 | 3/63 | Williamson | 91—51 |

FOREIGN PATENTS

| | | |
|---|---|---|
| 1,219,946 | 12/59 | France. |
| 568,404 | 1/33 | Germany. |

OTHER REFERENCES

"Astronautics," February 1958, pages 34 and 35.
"Time," Dec. 21, 1959, vol. LXXIV, No. 25, page 37.

SAMUEL LEVINE, *Primary Examiner.*